April 17, 1951    E. W. MOLDOVAN    2,549,224
GARDEN HOSE REEL
Filed Aug. 2, 1945    2 Sheets-Sheet 1
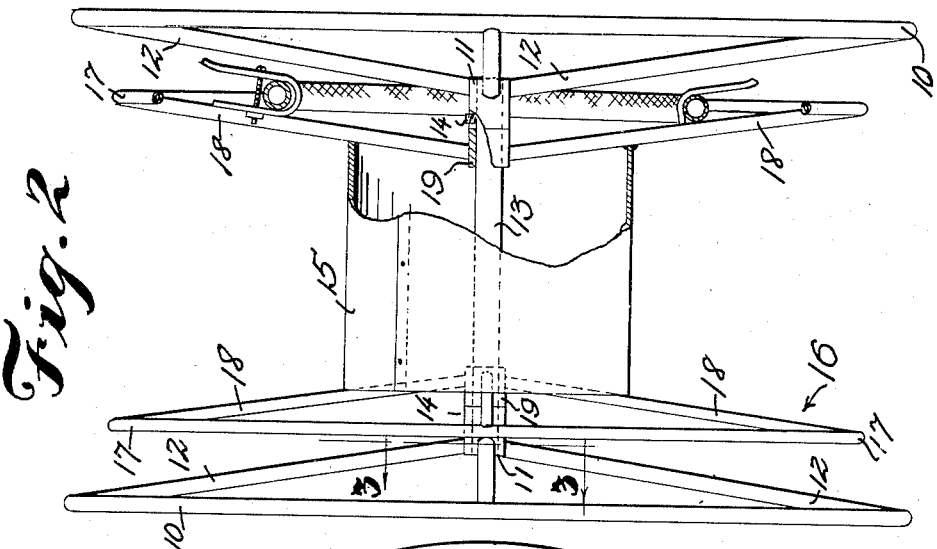
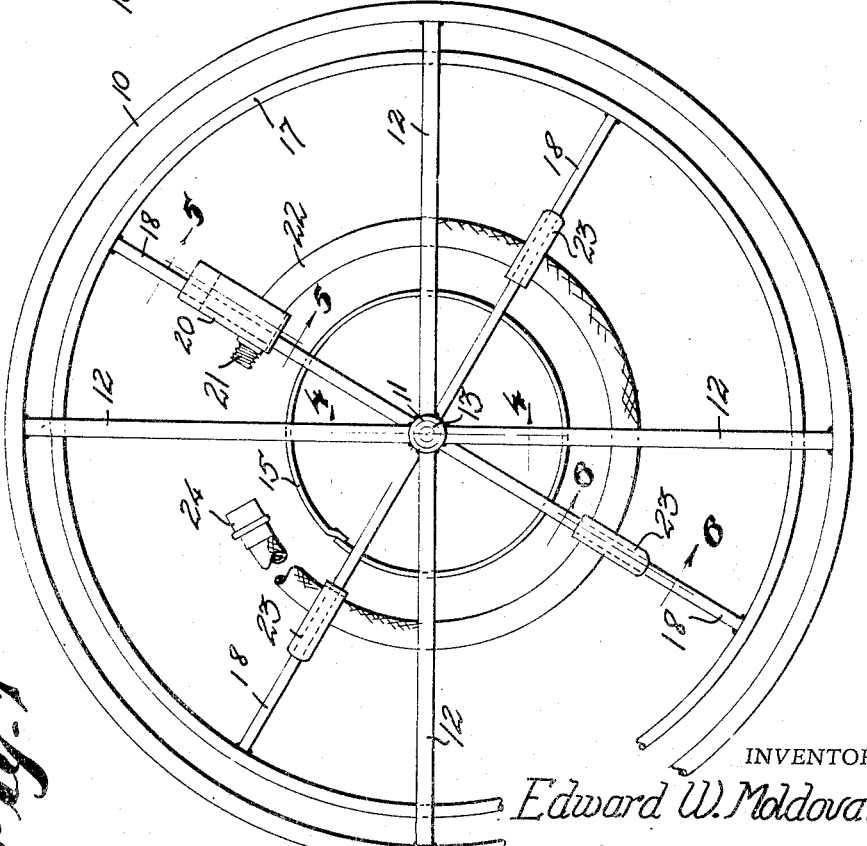
INVENTOR.
Edward W. Moldovan
BY Victor J. Evans & Co.
ATTORNEYS April 17, 1951 E. W. MOLDOVAN 2,549,224
GARDEN HOSE REEL
Filed Aug. 2, 1945 2 Sheets-Sheet 2
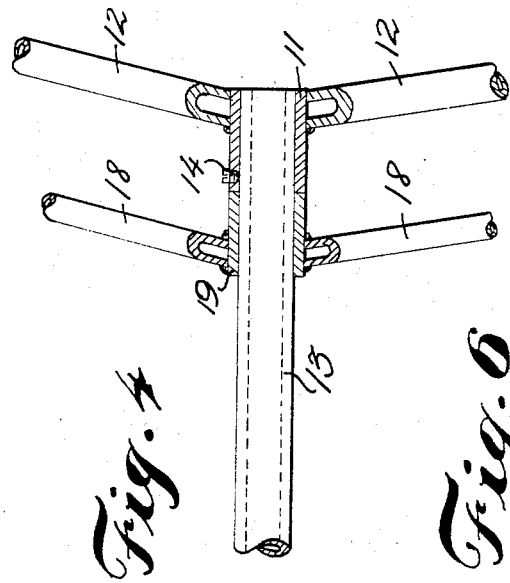
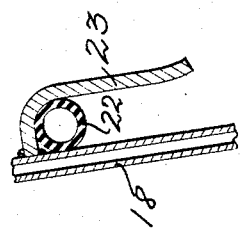
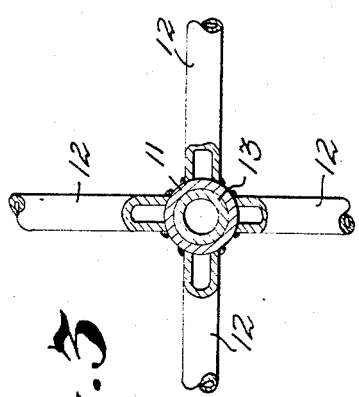
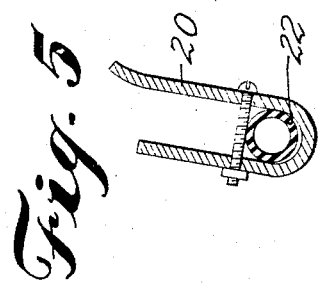
INVENTOR.
Edward W. Moldovan
BY Victor J. Evans & Co.
ATTORNEYS Patented Apr. 17, 1951

2,549,224

UNITED STATES PATENT OFFICE 2,549,224

GARDEN HOSE REEL

Edward W. Moldovan, Lakewood, Ohio

Application August 2, 1945, Serial No. 608,492

3 Claims. (Cl. 299—53)

The invention relates to a reel, and more especially to a garden hose wheeled reel.

The primary object of the invention is the provision of a reel of this character, which facilitates the winding and unwinding of a garden hose, as well as preserving it from wear and breakage, the reel being a carriage for the hose to bring the same to the point desired and removal therefrom.

Another object of the invention is the provision of a reel of this character, wherein the hose when wound thereon can be transported from one locality to another with ease and dispatch and without wear and tear on the hose proper, as there is no requirement of the dragging of the latter on rough surfaces and the kinking of such hose is entirely eliminated.

A further object of the invention is the provision of a reel of this character, which can be wheeled on the level or up and down stairways, within an enclosure or under a porch, there being a time saving in the laying of the hose and the gathering thereof.

A still further object of the invention is the provision of a reel of this character, which is simple in construction, thoroughly reliable and efficient in operation, strong, durable, neat in appearance, conveniently handled, wheel supported, and inexpensive to manufacture.

With these and other objects in view, the invention consists in the features of construction, combination and arrangement of parts as will be hereinafter more fully described, illustrated in the accompanying drawings, which show the preferred embodiment of the invention and pointed out in the claims hereunto appended.

In the accompanying drawings—

Figure 1 is a side view, partly broken away, of a reel constructed in accordance with the invention;

Figure 2 is a top plan, partly broken away;

Figure 3 is a sectional view taken on the line 3—3 of Figure 2 looking in the direction of the arrows;

Figure 4 is a sectional view taken on the line 4—4 of Figure 1 looking in the direction of the arrows;

Figure 5 is a sectional view taken on the line 5—5 of Figure 1 looking in the direction of the arrows:

Figure 6 is a sectional view taken on the line 6—6 of Figure 1 looking in the direction of the arrows.

Similar reference characters indicate corresponding parts throughout the several views in the drawings.

Referring to the drawings in detail, the reel constructed in accordance with the invention in its entirety comprises a pair of spaced traction wheels, each including a tubiform annular tread rim 10, having an inwardly disked spoke center formed with a sleeve-like hub 11 and radially directed tubular spokes 12, respectively, the latter being welded or otherwise joined with the rim and hub for effecting the unitary wheel.

Fitting the hubs 11 is an axle 13, and such hubs carry set screws 14 for detachably fastening the wheels on the axle. Upon this axle 13 is rotatably mounted the hose reeling unit proper which comprises a cylindrical center winding and unwinding center drum or windlass 15 having its ends welded or otherwise joined with spoked wheel-like turning guards 16, each including a tubular annular rim 17, radial spokes 18, and a center hub 19, respectively, the spokes 18 being welded or otherwise joined to the drum, hub and rim. The spoked central area of the guards are inwardly disked similarly to the wheels, and the diameters of the guards at the rims 17 are considerably less than the said wheels, which with the axle 13 fitted to the latter constitutes the wheeled carriage for the reeling unit.

The hubs 19 are loosely journalled on the axle 13 for turning or rotation thereon between the hubs 11 of the traction wheels.

The guards 16 are inwardly spaced from the traction wheels and to one of the spokes 18 of the guard at the outermost side thereof so as to be located in the space between such guard and the wheel next thereto is attached a double jaw releasing clamp 20, which is adapted to removably hold a male hose coupling member 21 of a hose section 22, which is looped in a series of single jaw hanger hooks 23, these being fixed to the other spokes 18 of the guard carrying the clamp 20, and the said clamp and with the hooks 23 are arranged spaced concentrically to the drum or windlass 15 within the space between the said guard and wheel next thereto. The end of the hose section 22 opposite the coupling member 21 is fitted with a female faucet coupling member 24 for connection with a water outlet faucet, not shown, when the reel is moved close to the latter. The male member 21 is for the attachment of the gardening water hose, not shown, adapted to be wound and unwound on and from the drum or windlass, and this hose is supplied with a suitable connection for the male member 21.

Assuming that the gardening hose has been wound on the reeling unit and a gardener desires to water a lawn, the reeling unit is manually grasped by the hands, and by pushing thereon the traction wheels of the carriage unit of the reel causes it to travel to the point to be watered. The nozzle carrying end of the gardening hose is dropped onto the ground or lawn, then by moving the said reel toward the faucet for the attachment of the gardening hose thereto, this dropped end of the latter causes the said gardening hose to unwind from the reeling unit. On arrival at the faucet, the female member 24 is attached to the faucet, this being accomplished by first pulling upon the section 22 for the straightening out of a part or all thereof, which disengages it from the hooks 23, the section 22 being a wearing part of the reeling unit at all times. This arrangement of the section 22 does not require the entire unwinding of the gardening hose from the drum or windlass 15, unless the distance from the locality to be watered to the faucet requires this, for the attachment of the female member 24 thereto. Further, such arrangement prevents the requirement of the disconnection of the gardening hose from the section 22 at the male coupling member 21, either for the winding or unwinding of the gardening hose on and from the reeling unit. Of course, the section 22 can be of any determined length with one end clamped to the reeling unit and the other end releasably held thereon for varying reach purposes of such section from the reeling unit to the faucet, as should be obvious.

When the gardening hose is released from the water outlet faucet, it can be readily rewound onto the reeling unit of the reel, as should be apparent.

What is claimed is:

1. In a garden hose reel carriage, the combination which comprises a pair of ground engaging wheels, an axle on the ends of which the said ground engaging wheels are mounted in spaced relation, a hose carrying reel having spaced wheels with rims carried by spokes extended radially from hubs and having a drum positioned between and carried by the said wheels, said reel positioned between the ground engaging wheels and rotatably mounted on the said axle, a screw actuated clamp mounted on the outer surface of one of the wheels of the reel, a plurality of hanger hooks mounted in spaced relation on the outer surface of the wheel of the reel on which the said clamp is mounted, and a hose section having a male coupling on one end and a female coupling on the other carried by said hanger hooks with the end on which the said male coupling is positioned secured in said screw actuated clamp.

2. In a garden hose reel carriage, the combination which comprises a pair of ground engaging wheels, an axle on the ends of which said ground engaging wheels are mounted with the said wheels in spaced relation, a hose carrying reel having spaced wheels carried by hubs and journaled through the hubs thereof on the axle on the ends of which the said ground engaging wheels are mounted, a drum positioned between and carried by the said wheels of the reel, a screw actuated clamp mounted on the outer surface of one of the wheels of the reel, a plurality of hanger hooks mounted in spaced relation on the outer surface of the wheel of the reel on which the said clamp is mounted, the wheels of the said reel and also the said ground engaging wheels being dished inwardly with the rims thereof positioned in planes extended outwardly beyond the hubs thereof, and a hose section having a male coupling on one end and a female coupling on the other carried by the said hanger hooks with the end on which the said male coupling is positioned secured in said screw actuated clamp.

3. In a garden hose reel carriage, the combination which comprises a pair of ground engaging wheels, an axle on the ends of which said ground engaging wheels are mounted with the said wheels in spaced relation, a hose carrying reel having spaced wheels carried by hubs and journaled through the hubs thereof on the axle on the ends of which the said ground engaging wheels are mounted, a drum positioned between and carried by the said wheels of the reel, a screw actuated clamp mounted on the outer surface of one of the wheels of the reel, a plurality of hanger hooks mounted in spaced relation on the outer surface of the wheel of the reel on which the said clamp is mounted, the wheels of the said reel and also the said ground engaging wheels being dished inwardly with the rims thereof positioned in planes extended outwardly beyond the hubs thereof, the diameter of the said ground engaging wheels being greater than the diameter of the wheels of the reel whereby the reel is suspended with the lower edges of the wheels thereof spaced above the ground so that the reel is free to rotate independent of the said ground engaging wheels, and a hose section having a male coupling on one end and a female coupling on the other carried by the said hanger hooks with the end on which the said male coupling is positioned secured in said screw actuated clamp.

EDWARD W. MOLDOVAN.

REFERENCES CITED

The following references are of record in the file of this patent:

UNITED STATES PATENTS

| Number | Name | Date |
|---|---|---|
| 241,961 | Gilbert | May 24, 1881 |
| 588,897 | Casselman | Aug. 24, 1897 |
| 1,165,277 | Munson | Dec. 21, 1915 |
| 1,255,854 | Boss | Feb. 12, 1918 |
| 1,881,539 | Harris | Oct. 11, 1932 |
| 2,096,225 | Crawford | Oct. 19, 1937 |